United States Patent [19]
Ueno et al.

[11] Patent Number: 5,590,314
[45] Date of Patent: Dec. 31, 1996

[54] APPARATUS FOR SENDING MESSAGE VIA CABLE BETWEEN PROGRAMS AND PERFORMING AUTOMATIC OPERATION IN RESPONSE TO SENT MESSAGE

[75] Inventors: Hitoshi Ueno, Zama; Junichi Kazama, Yokohama; Hirofumi Kinoshita, Yokohama; Masaki Sato, Yokohama, all of Japan

[73] Assignees: Hitachi, Ltd., Tokyo; Hitachi Software Engineering Co., Ltd., Yokohama, both of Japan

[21] Appl. No.: 320,676

[22] Filed: Oct. 11, 1994

[30] Foreign Application Priority Data

Oct. 18, 1993 [JP] Japan ................................ 5-259588

[51] Int. Cl.$^6$ ................................ G06F 19/00
[52] U.S. Cl. ................ 395/681; 395/882; 395/892
[58] Field of Search ................................ 395/282, 283, 395/284, 286, 882, 893, 500, 700, 892

[56] References Cited

U.S. PATENT DOCUMENTS

| | | | |
|---|---|---|---|
| 5,046,087 | 9/1991 | Sakai | 379/201 |
| 5,276,863 | 1/1994 | Heider | 395/200.12 |
| 5,349,675 | 9/1994 | Fitzgerald et al. | 395/800 |
| 5,404,541 | 4/1995 | Hirosawa et al. | 395/750 |
| 5,444,849 | 8/1995 | Farrand et al. | 395/200.09 |

OTHER PUBLICATIONS

Davis, W. S. *Operating Sytems, A Systematic View*, Addison–Wesley Publishing Co., Inc., 1987, pp. 126–130 (English).

Johnson, Robert H. *MVS Concepts and Facilities*, Intertext Publications/Multiscience Press, Inc., 1989, pp. 265–269 (English).

*Primary Examiner*—Ken S. Kim
*Attorney, Agent, or Firm*—Fay, Sharpe, Beall, Fagan, Minnich & McKee

[57] ABSTRACT

An automated operation machine including a first device driver for transmitting a console display message given by being addressed from a program for automatic operation, and a first adaptor connected to the first device driver, for outputting said console display message in a preselected format, can additionally own automatic operation performance without changing the first device driver by including the below-mentioned arrangements. That is, this automated operation machine is included of a second device driver for transmitting a predetermined operator command given from an operator program in correspondence to acertain message, a second adaptor connected to the second device driver, for outputting the operator command in a predetermined format, and a connection cable for mutually connecting the first device driver with the second device driver and for switching the console display message and the operator command between the first and second device drivers in order to continue the above-explained automatic operation. The connection cable is mutually cross-connected between on pair of input and output terminals of the first and second adaptors. The memory stores a console change program used to change the content of the configuration information area. Another device driver connected to a LAN is selectable by being addressed from the display program in order to input a command.

17 Claims, 10 Drawing Sheets

APPARATUS FOR SENDING MESSAGE VIA CABLE BETWEEN PROGRAMS AND PERFORMING AUTOMATIC OPERATION IN RESPONSE TO SENT MESSAGE

BACKGROUND OF THE INVENTION

The present invention relates to an automatic (automated) operation apparatus capable of automating an operator console operation commanded by an operating system, or an application program.

The automating technique for the operator console operation is disclosed in "Operating Systems, A systematic View" by W. S. Davis, Addison-Wesley Publishing Co., Inc., 1987, p.p. 126–130, and "MVS Concepts and Facilities" by R. H. Johnson, Intertext Publications/Multiscience Press, Inc., 1989, p.p. 265–269.

As to such an automatic operation apparatus for accepting a message outputted to the operator console by the operating system and/or the application program and for automatically producing a response to this message, messages outputted to the operator console are acquired by way of the virtual console function such as the message processing facility (MPF) registered in the console managing program, e.g., the device driver and the console task.

As a consequence, in order to acquire the message by this method, it is required to register such a function into the console management program, by which the message is read and a response to this message is sent back, namely to register the virtual console function. At the same time, it is required to provide an interface for passing the message from the console management program to the virtual console function.

Also, in an automatic operation control system for computers wherein a message to be outputted to the console is passed via the message transfer control unit mounted inside the control unit for outputting the message data to the console, to the automatic operation control system, and analyzed to execute a predetermined operation, the message transfer control unit is required to be employed in the message output control unit in this automatic operation control system for computers. Moreover, the transfer interface for the message data via the message transfer control unit must be provided between the message output control unit and the automatic operation control system.

As described in such conventional automatic operation systems, acquisition of the message directed to the operator console by the automatic operation program can be realized by employing the specific interface of automatic operation acquisition in either the device driver of the operator console, or the equivalent portion thereof corresponding to a portion of the operating system. Also, transfer of the command from the automatic operation program to the console management program can be realized by employing such an interface for the virtual console function of the automatic operation.

The above-explained prior art system is limitedly useful for such a condition that the automatic operation is supported on a single operating system realized on a single sort of computer architecture. This is because the automatic operation interface may be employed in this device driver so as to automatically operate the operator console.

However, there is such a problem in case that any firms other than the computer and/or operating system (OS) developing firm will develop automatic operation functions for this computer and OS. That is, if they are short of information used to develop the device drivers, then it is rather difficult to provide the automatic operation interface with the device driver.

SUMMARY OF THE INVENTION

Another object of the present invention is to provide such an automatic operation apparatus capable of acquiring a message directed to an operator console by an automatic operation program, and furthermore capable of automatically producing a command for the operator console by the automatic operation program without changing a device driver, namely without employing an interface for a virtual console function in the device driver.

Another object of the present invention is to provide an automatic operation system capable of employing such an automatic operation program used to perform an automatic operation by a computer controlled to execute automatic operation per se when a computer for controlling automatic operation is connected to the computer controlled to execute automatic operation.

A further object of the present invention is to provide an automatic operation apparatus capable of operating an automatic operation program while operating the automatic operation program within a computer controlled to execute automatic operation, even when an automatic operation function can be assembled into a device driver, with employment of the same interface as that for such a case that the function cannot be added to the device driver.

A still further object of the present invention is to provide an automatic operation system capable of using a common automatic operation program without developing automatic operation programs suitable for various manufacturers' computers whose device drivers cannot be altered, or modified, and furthermore capable of providing the same automatic operation program interface even for such a computer whose device driver may be altered, or modified without developing different automatic operation programs suitable for various types of computers.

The above-described objects of the present invention can be achieved by connecting the below-mentioned arrangements to an automated operation machine including:

a first device driver for transmitting a console display message given by being addressed from a program for automatic operation; and a first adaptor connected to the first device driver, for outputting the console display message in a preselected format. The automatic operation performance may be additionally provided without changing the first device driver.

That is, the above-described arrangements connected to the automated operation machine are:

a second device driver for transmitting a predetermined operator command given from an operator program in correspondence to a certain message;

a second adaptor connected to the second device driver, for outputting the operator command in a predetermined format; and a connection cable for mutually connecting the first device driver with the second device driver and for switching the console display message and the operator command between the first and second device drivers in order to continue the above-explained automatic operation. The connection cable is mutually cross-connected between one pair of input and output terminals of the first and second adaptors. The memory stores a console change program used to change the content of the configuration information area. Another device driver connected to a LAN is selectable by being addressed from the display program in order to input a command.

When the function can be added to the device driver, these objects of the present invention can be achieved by executing data transmission between the device drivers without employing a physical connection apparatus.

DESCRIPTION OF THE PREFERRED EMBODIMENTS

Figure 1:
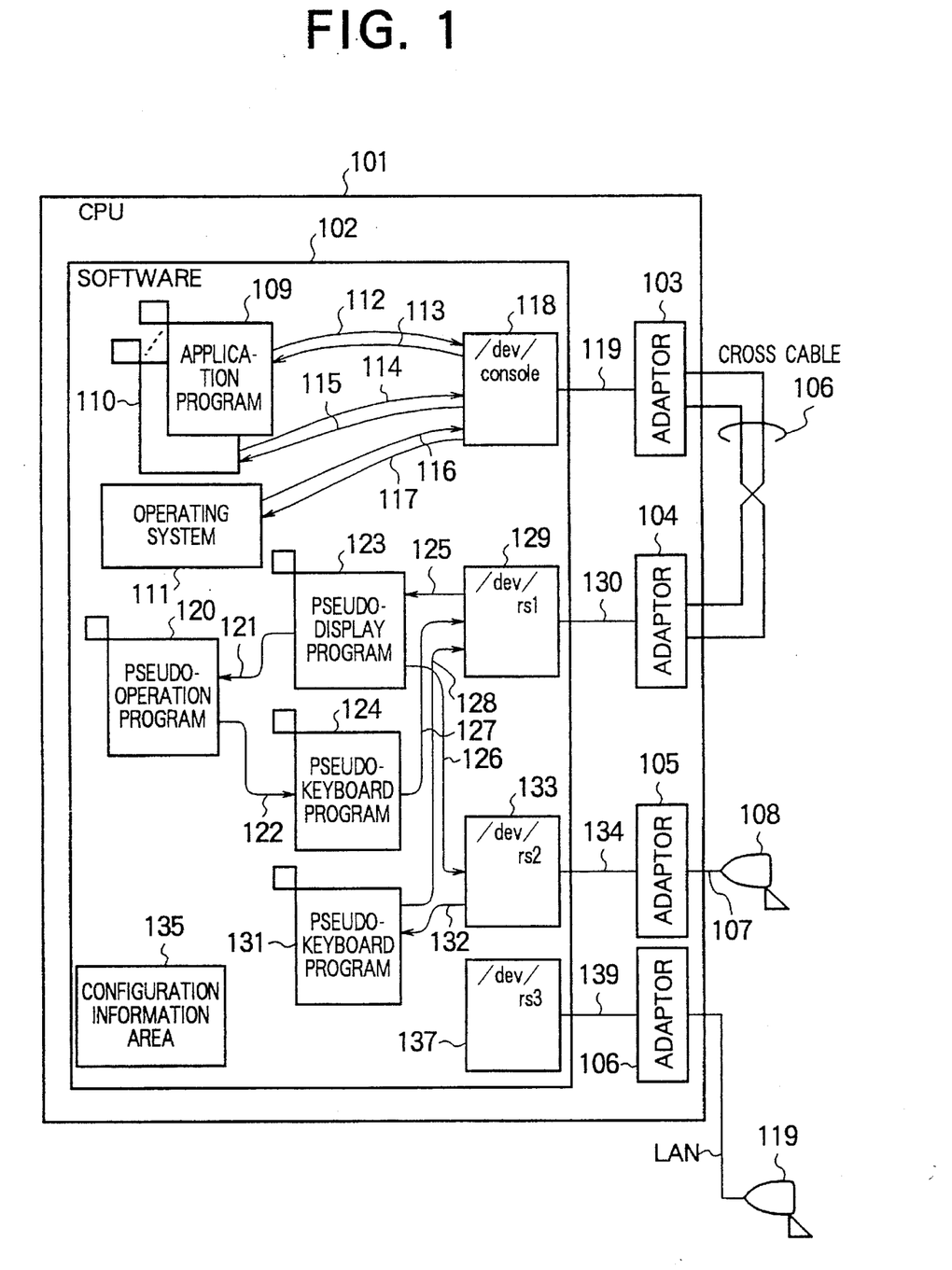
FIG. 1 is a schematic block diagram for showing automatic operation in case that a computer controlled to execute automatic operation is identical to an automatic operation control computer.

FIG. 1 schematically shows an arrangement of an automatic operation computer, or automated operation computer, to which the present invention is applied.

In this automatic operation computer of FIG. 1, a software 102 contains a program run on a CPU (central processing unit) 101 and various data stored in a memory device of this CPU 101. When either application programs 109 and 110 stored in the memory device employed in the CPU 101, or an operating system 111 outputs a message to an operator console, message (character) string data is written by designating a device special file "/dev/console" (arrows 112, 114, 116). When these application programs and operation system read a response command, command (character) string data is read by designating the device special file "/dev/console" (113, 115, 117). These read and write commands are transferred to a device driver 118 which has a role to control the device special file "/dev/console". Then, the device driver 118 performs a representation to a console display and an input from a console keyboard by controlling a console adaptor 103.

Usually, such a serial port called as "RS-232C" has been utilized in an adaptor for an operator console. To the adaptor 103 of the embodiment shown in FIG. 1, not a console, but another adaptor 104 is connected, so that such a message indicative of conditions various errors occurred during the executions of the application program and the operation program under automatic operation, is sent to a device driver 129, whereas either a response or a command to execute the automatic operation with regard to this error is returned from the device driver 129 to the device driver 118. When both of the console apparatus adaptor 103 and an automatic operation adaptor 104 are of the serial port, a cross cable 106 is employed as a connection apparatus for connecting both of the adaptors 103 and 104. Since this cross cable 106 is so arranged that one SD (Send Data) signal line is connected to another RD (Receive Data) signal line opposite to the SD signal line with commonly using a ground signal line, and a RD signal line of the former side is connected to an SD signal line opposite to that of the former side, whereby the SD signal lines are intersected by the RD signal lines, this cable 106 is so-called as a "cross cable".

The adaptor 104 receives a message signal sent out from the adaptor 103 and reports an arrival of reception data to a device driver 129 of an automatic operation control device "/dev/rs1" by way of an interrupt signal or the like. The device driver 129 requested, in response to the message signal, to send out a command input character string for executing an automatic operation will control the adaptor 104 to transmit data to the adaptor 103.

Continuously, the message arrivals are monitored by a pseudo-display program 123 stored in a memory (not shown) of the CPU 101. Every time the message is arrived, the pseudo-display program 123 reads out the device driver 129 (arrow 125) to acquire a message character string. The pseudo-display program 123 passes the acquired character string to a device driver 133 of a physical console device "dev/rs2" (126) and displays this acquired character string on a physical consoles 108 via an adaptor 105 and a signal line 107. If a pseudo-operator program 120 is initiated, the message received by the pseudo-display program 123 is also passed to the pseudo operator program 120 (121). The pseudo-operator program 120 automatically supplies a console command in correspondence with the console message read therein. The character string of this command is passed to a pseudo-keyboard program 124 (122), and then the pseudo-keyboard program 124 passes this data to the device driver 129 (127), thereby executing a command input to the console device "/dev/console".

A predetermined automatic command supply is carried out by way of the operation program 120 and the keyboard program 124. Alternatively, a command may be supplied from the keyboard of the physical console 108 by any human operator other than the above-explained automatic command supply by connecting the keyboard program 131, the device driver 129, and the adaptor 105 to the console 108. The command inputted from the keyboard is accepted via the signal line 107 and the adaptor 105 to the device driver 133, and then is passed to the pseudo-keyboard program 131 for continuously monitoring this physical console 108 (132). The pseudo-keyboard program 131 passes the command character string data accepted from the keyboard to the device driver 129 of the automatic operation device (129).

Generally speaking, a special file name of a console device is "/dev/console". It is convenient to freely define both a special file name of an automatic operation device and a special file name of a physical console device, because there are many possibilities that these special file names are different, depending upon users. In order that the device special file names can be defined as such configuration information, a configuration information area 135 is owned.

Figure 2:
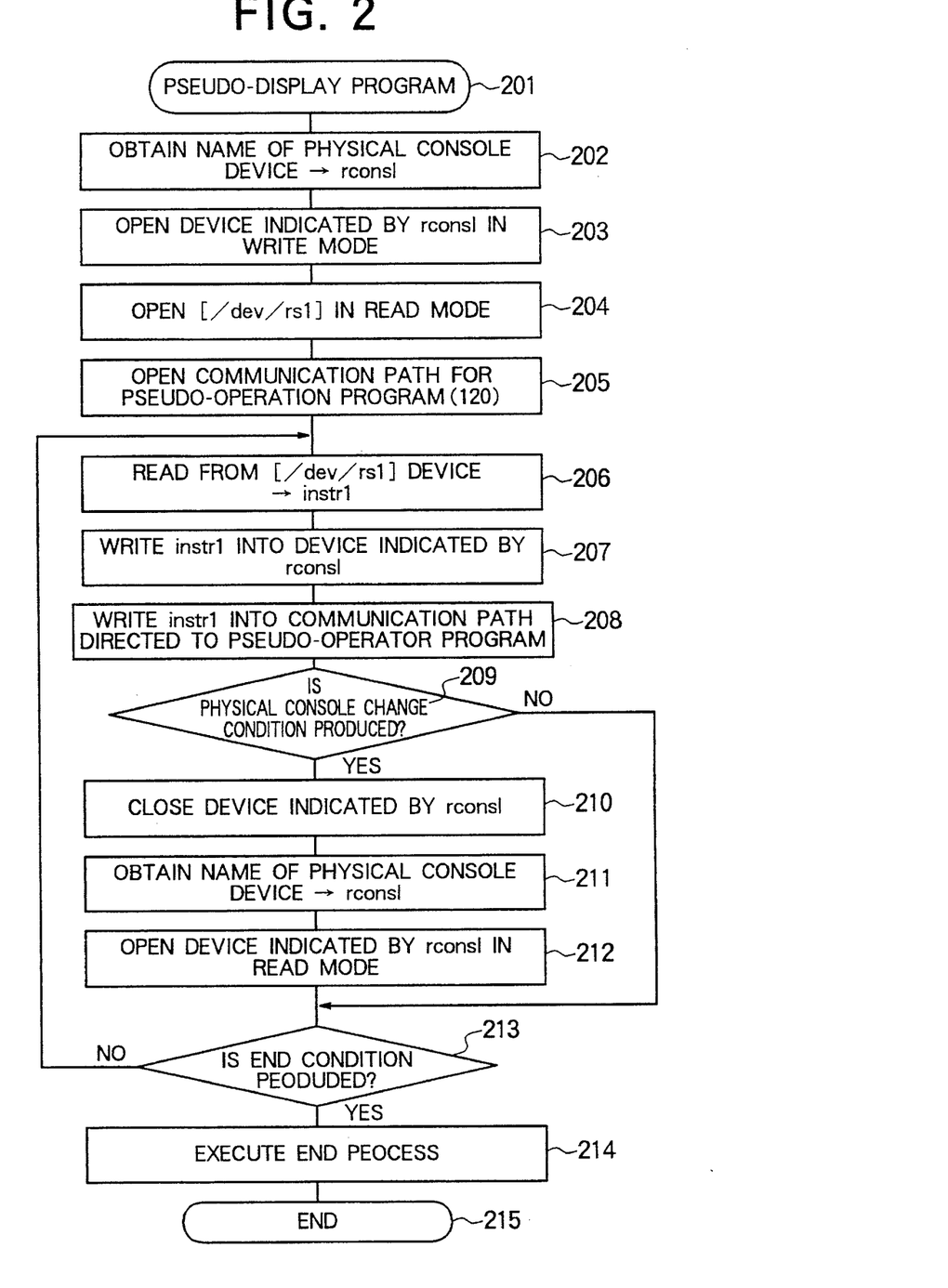
FIG. 2 is a flow chart for indicating operation of a pseudo-display program.

Next, operations of the pseudo-display program 123 will now be described with reference to a flow chart shown in FIG. 2. The pseudo-display program 123 is initiated during a series of process operation to start up the system which is commenced by power-on the computer. First, the name of the physical console device 108 is obtained from the configuration information and then is stored into the character string storage area "rconsl" (step 202). The physical console device indicated by this name is open in the write mode (step 203), and the automatic operation device "/dev/rs.1" is open in the read mode (step 204). When designation is made of the physical console device within the configuration information area 135 and also of another device special file name as the automatic operation device, each of the designated other devices is open. For instance, the device driver 137 connected via an LAN and the adaptor 106 to the physical console 119 may be previously designated within the area 135 instead of the device driver 133. Then, a communication path from the designated device to the pseudo-operator program 120 is open in the write mode (step 205).

Subsequently, the console message character string received by the automatic operation device 129 is read and stored into a character string memory area "instr1" (step 206). This character string is written into such a physical console device as indicated by "rconsl" (step 207), and furthermore written into a communication path with regard to the pseudo-operator program 120 (step 208). As a result of this operation, the character string received as the console message is displayed on the physical console device 108 and also is passed to the pseudo-operator program.

Next, a judgement is made as to whether or not a change demand of the physical console, e.g., 108 is issued with reference to the configuration information region 135 (step 209). If no change demand is issued, then the process operation is advanced to another judgement of an end condition (step 213). To the contrary, if the change demand is issued, then a device which is presently open as the physical console and is indicated by "rconsl" is closed (step 210). Then the name of the new physical console device, for example, device 119 is read out from the configuration information area 135, and stored into the device "reconsl" (step 211). This device is open in the read mode (step 212) and the process operation is advanced to the judgement of the end condition (step 213). When a detection is made that a stop command is externally entered at the step 209, the process operation is advanced to an end process 214.

If no end condition is produced, then the operation for reading the console message is again commenced. In case when such an end condition that the process operation is entered into the system stop sequence is produced, and end process as defined at a step 214 is executed. It should be noted that the end process contains a process to close a device.

Figure 3:
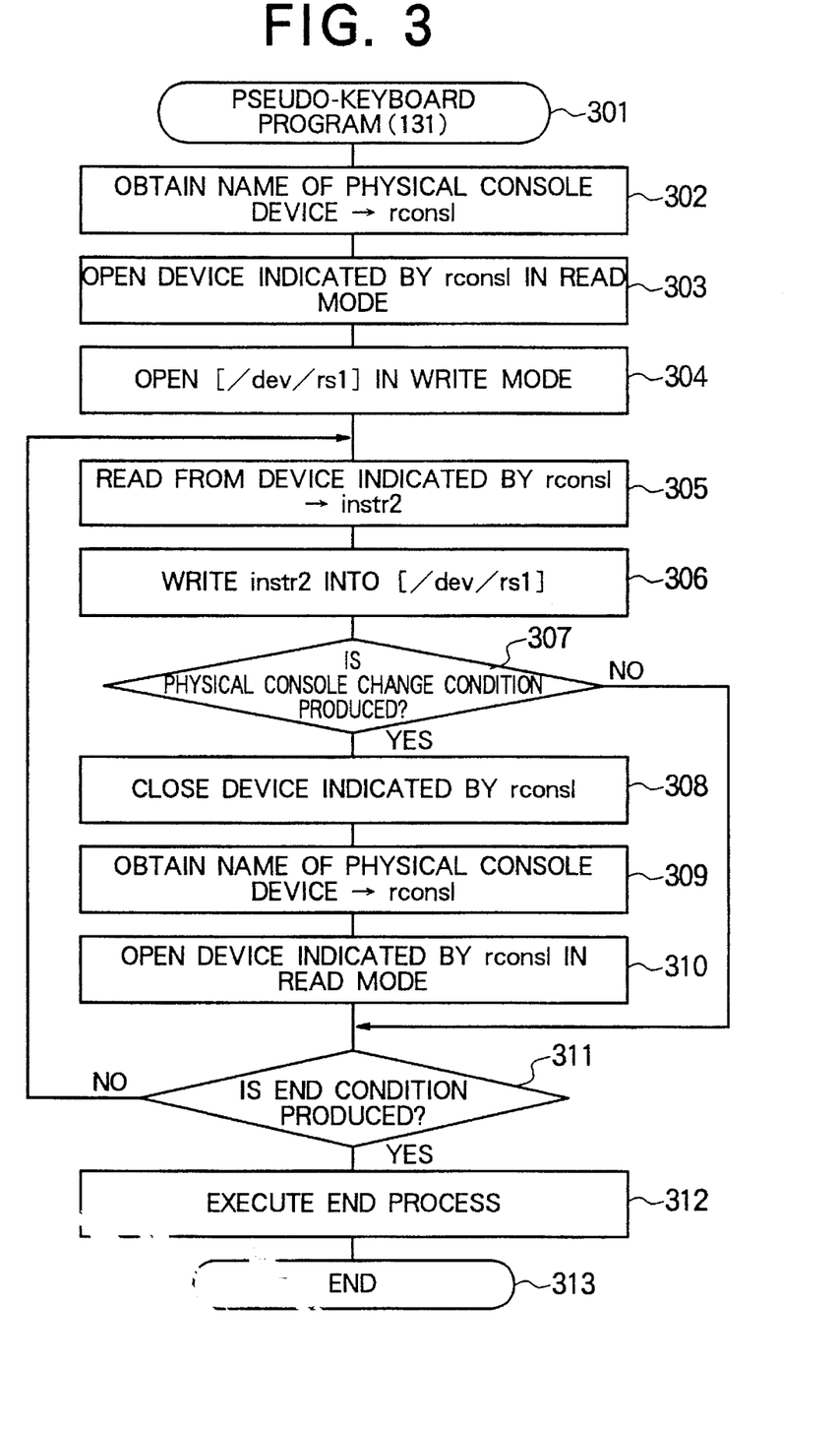
FIG. 3 is a flow chart for representing operation of a pseudo-keyboard program for accepting an input of a physical console.
Figure 4:
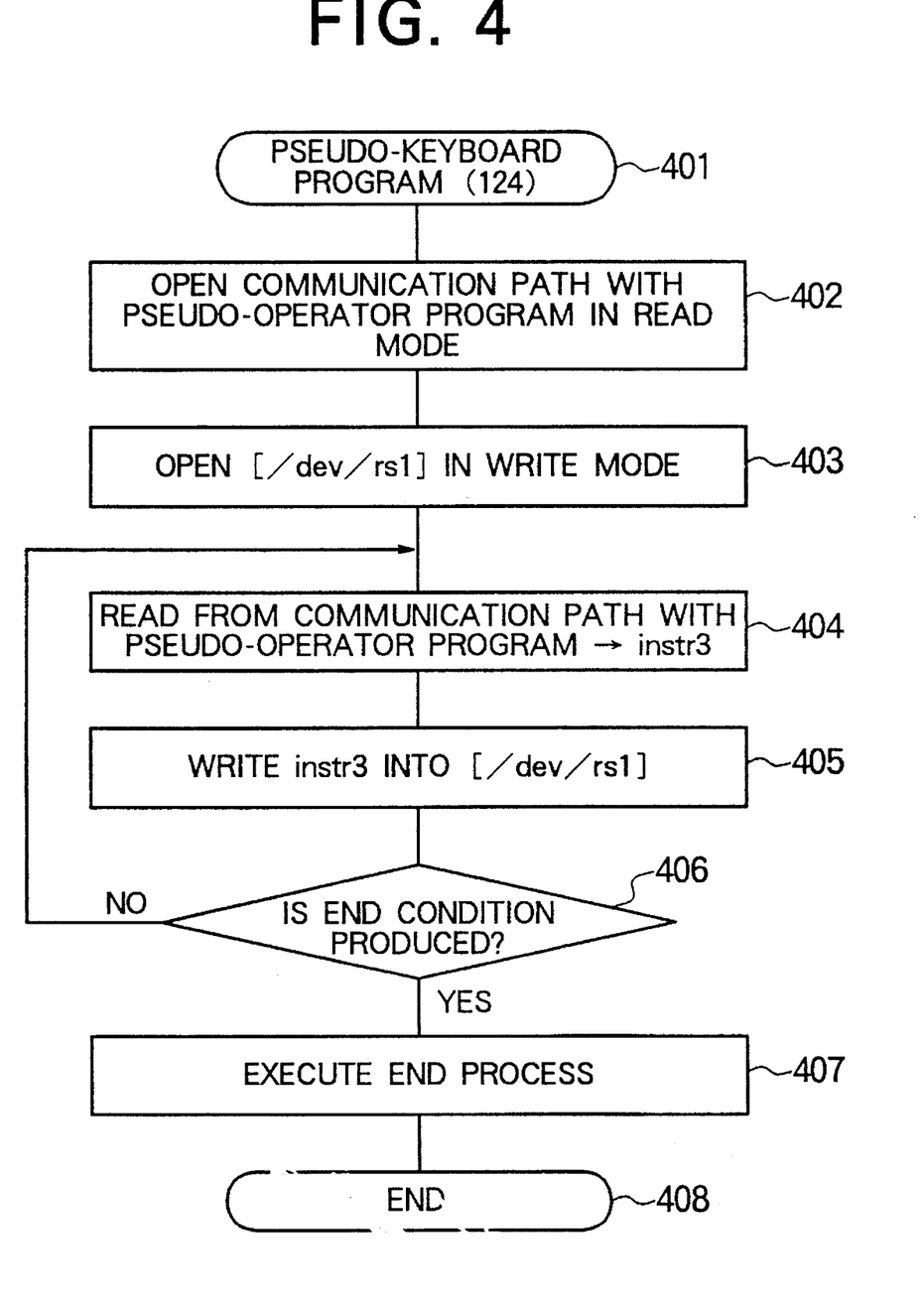
FIG. 4 is a flow chart for showing operation of a pseudo-keyboard program for accepting an input of a pseudo-operator program.
Figure 5:
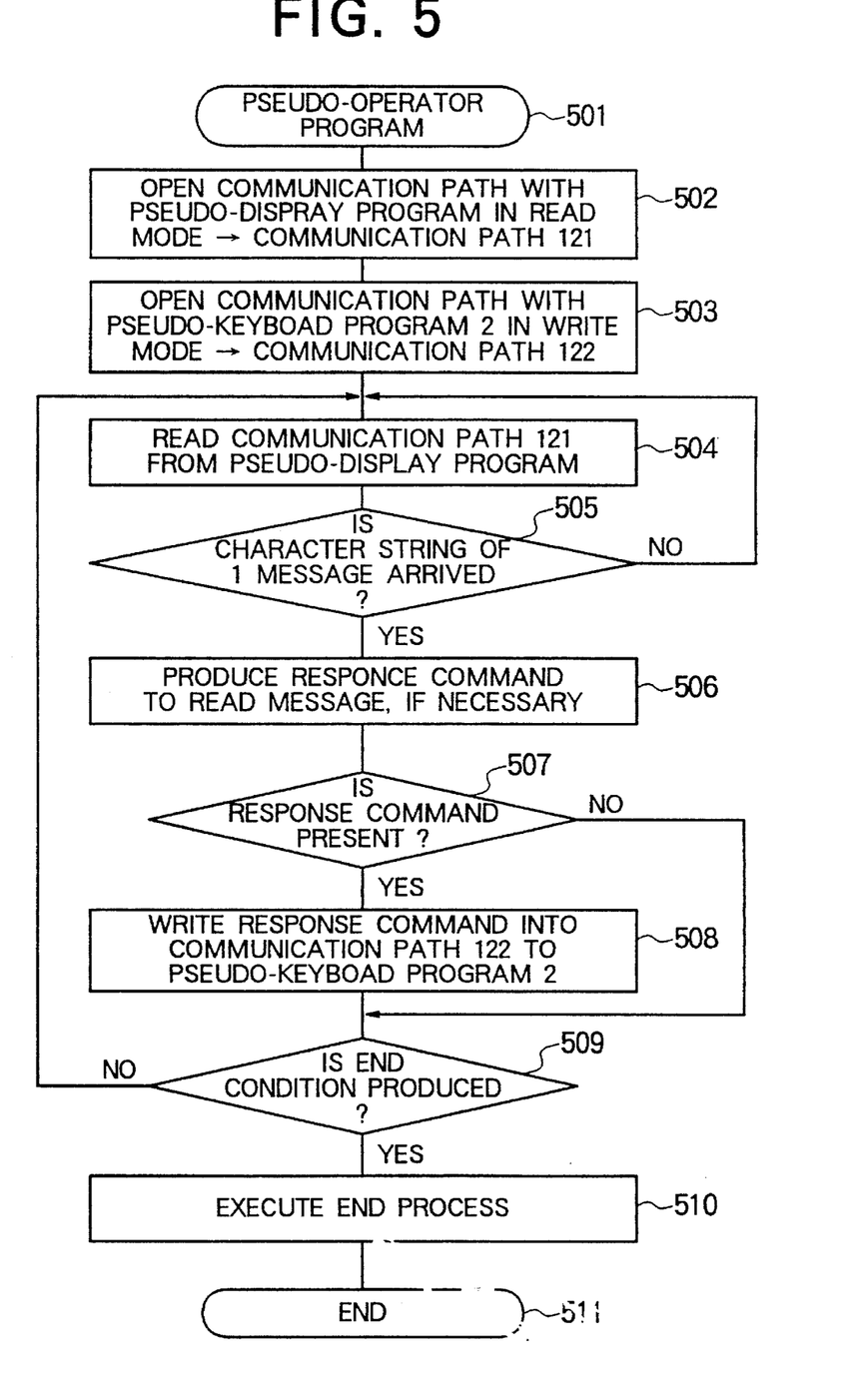
FIG. 5 is a flow chart for indicating operation of the pseudo-operator program.

Before describing an operator program 501 for receiving a message and for sending back a response in response to this received message with reference to FIG. 5, a keyboard program will now be explained by referring to FIG. 3 and FIG. 4.

Operations of the pseudo-keyboard program 131 will be explained by using a flow chart of FIG. 3. The pseudo-keyboard program 131 is initiated during a series of process operation for starting up the system which is commenced by powering-on the computer. First, the name of the physical console device is obtained, the character string of the obtained name is stored into the character string memory region "rconsl" (step 302), and this console device is opened in the read mode (step 303). Furthermore, the device "/dev/rsl" corresponding to the automatic operation device is opened in the write mode (step 304). The name of the physical console device may be obtained by reading the configuration information area 135.

Subsequently, the process operation waits for an entry of a command from a physical console device indicated by "rconsl" by employing a read system call. Once the command is entered, the character string thereof is stored into a character string memory region "instr2" (step 305), and this character string is written into the automatic operation device "/dev/rs1" (step 306).

Thereafter, when such a demand to change the physical console device is not produced (step 307), a judgement is made as to whether or not the end condition is produced (step 311). If no end condition is produced, then the process operation is again repeated from the step 305. Conversely, when the change demand of the physical console is discovered at the step 307, the device indicated by "rconsl" is closed (step 308), and the name of the device which is newly used as the physical console is obtained. The obtained device name is stored into the device "rconsl" (step 309), and this device is open in the read mode (step 310). When the end condition is produced, such an end process for closing the respective devices under open is executed (step 312), whereby the program is complete.

Referring now to a flow chart of FIG. 4, operations of the pseudo-keyboard program 124 will be explained. The pseudo-keyboard program 124 is initiated during a series of system start-up process operation which is commenced by turning ON the power source of the computer. First, a communication path with this pseudo-keyboard program 124 is open (step 402), and the automatic operation device "/dev/rsl" is open in the write mode (step 403).

Next, to detect a command inputted from the pseudo-operator, a read system call is issued to the communication path for the pseudo-operator program, thereby waiting for an arrival of data. Upon arrival of the data, a character string thereof is stored into a character string memory region "instr3" (step 404), and is written into the automatic operation device "/dev/rsl" (step 405).

Thereafter, if the end condition is produced (step 406), then such an end process operation that all of the open devices are closed and the like, is carried out (step 407). Then, the pseudo-keyboard program is complete. To the contrary, if the end condition is not produced (step 406), then the process operation is again returned to the previous step 404 at which the system waits for the command entered from the pseudo-operator program.

Subsequently, operations of the pseudo-operator program 120 will now be described with reference to FIG. 5. The pseudo-operator program 120 is initiated by way of a series of system start-up process operation which is commenced by turning ON the power source of the computer. First, a communication path 121 with the pseudo-display program 123 is open in the read mode (step 502), and another communication path 122 with the pseudo-keyboard program 124 is open in the write mode (step 503).

Next, a read operation is executed for the communication path 121 from the pseudo-display program 123 by the read system call (step 504). The character data are continuously read and stored until a character string implying one message can be supplied (step 505). Thereafter, the read message is analyzed, and if it is required to automatically respond, then a character string of a response command is produced (step 506). When there is provided such a response command which is required to be automatically supplied (step 507), this response command is written into the communication path 122 to the pseudo-keyboard program 124 (508).

Then, if no end condition is produced (step 509), then the message read operation from the pseudo-display program is again repeatedly performed (step 504). Conversely, if the end condition is produced, then such an end process that all of the open devices are closed and the like, is performed (step 510) so that this program execution is accomplished.

According to the above-described embodiment with reference to FIG. 1 to FIG. 5, it is possible to acquire the console message and to automatically supply the automatic responding command to the operator console without altering, or modifying the device drivers employed in the operating system.

Figure 6:
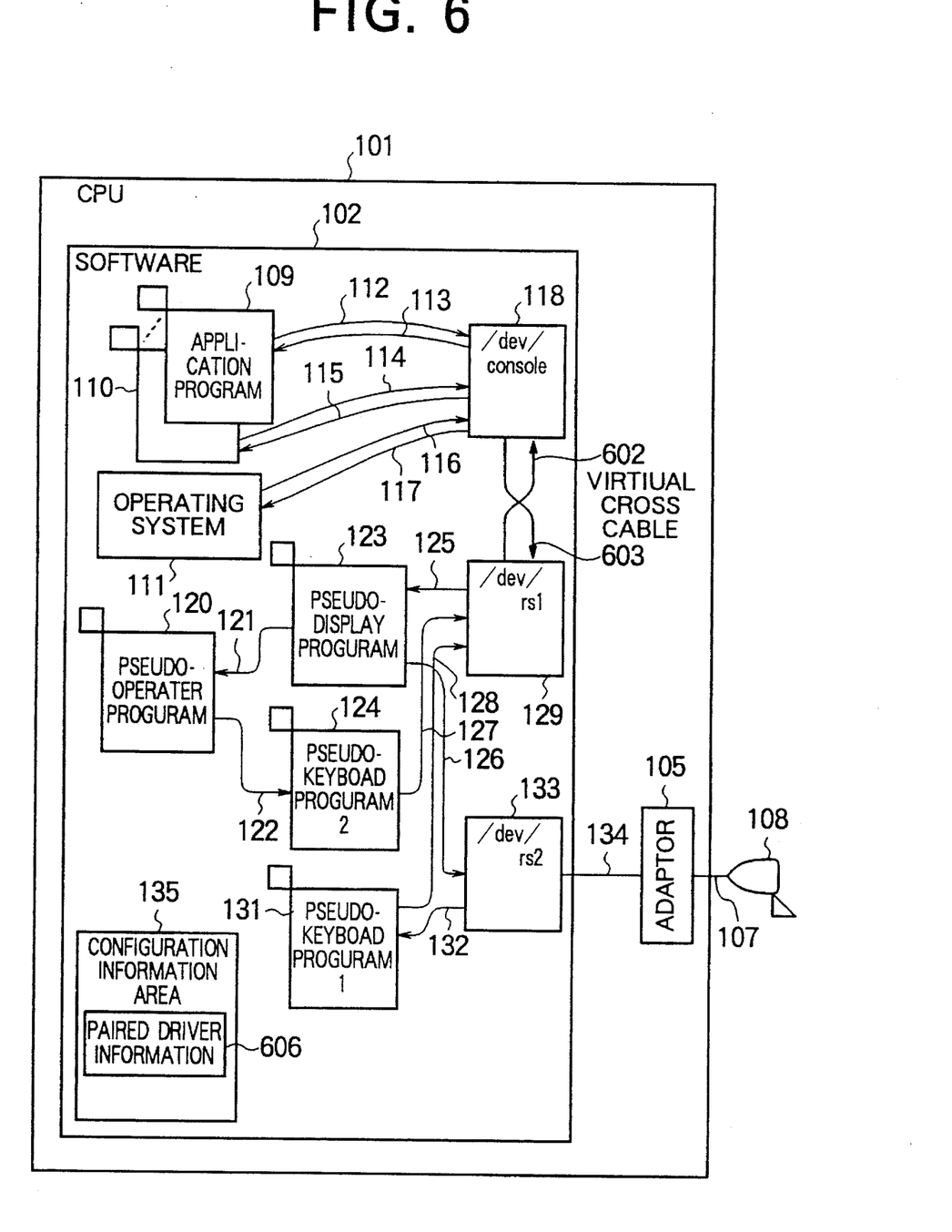
FIG. 6 is a schematic block diagram to execute an automatic operation by mutual communication between test drivers.

Referring now to FIG. 6, a description will be made of such a computer apparatus that the automatic operation program can be executed without entirely changing the above-described software structure even when the device driver can be altered, or modified.

FIG. 6 schematically indicates an arrangement of a computer controlled to execute automatic operation, by which an automatic operation control is carried out. Although the device driver 118 for the operator console merely controls the interface adaptor 103, a device driver 601 is employed in the arrangement of FIG. 6, which does not control, the interface adaptor, but owns such a function capable of performing a data transfer operation among other device drivers. Similarly,, as to a device driver for automatic operation, such a device driver 604 having a function to perform a data transfer among other device drivers is employed which does not control the interface adaptor.

In accordance with this embodiment, it is possible to realize the structure of the automatic operation system with the substantially same software configuration as that of the previous embodiment shown in FIG. 1 by employing a virtual cross cable between the device driver 601 for the operator console and the device driver 604 for the automatic operation. The virtual cross cable is constituted by a pair of buffers employed within two sets of device drivers which are defined as one set of paired drives. The virtual cross cable is realized by such operations that when one device driver accept a write command, data is written into a receiving buffer of the other device driver. The definition of the paired drivers is stored as paired driver information 606 within the configuration information area 135.

In FIG. 7 through FIG. 10, there are represented operations of the device drivers.

Figure 7:
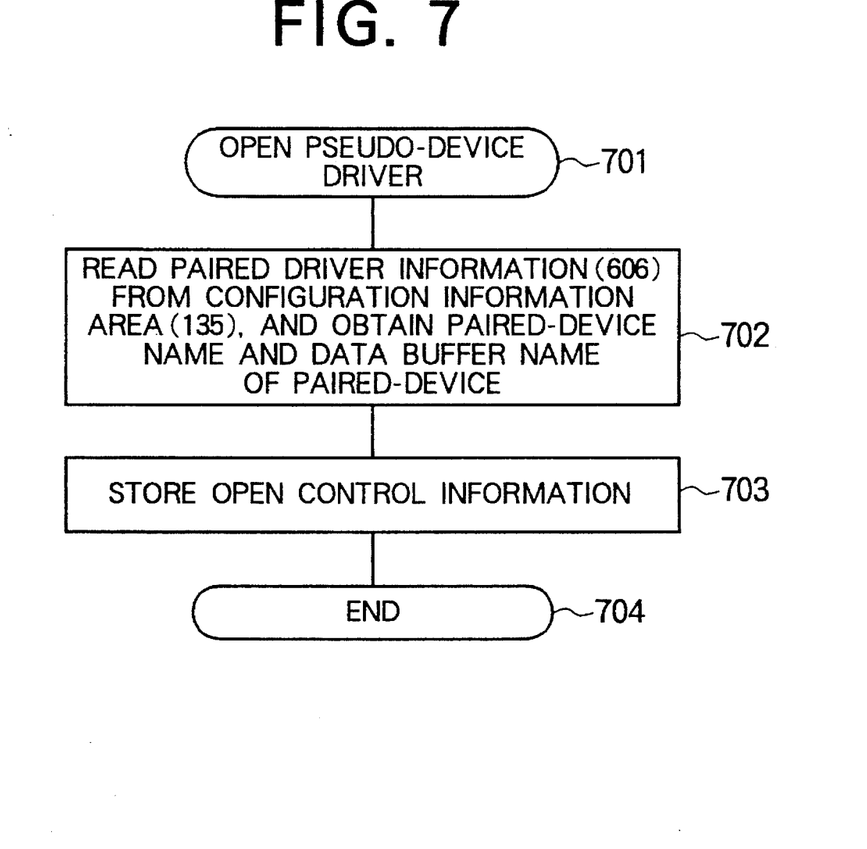
FIG. 7 is a flow chart for indicating an open process operation of the test driver.

FIG. 7 is a flow chart for indicating open process operations of the device drivers 601 and 604. Upon receipt of an open process demand issued from the application program and the like to this device driver, the paired driver information 606 is first read out from the configuration information area 135, whereby both the device name of the other device driver and a data buffer address of this device driver are obtained (step 702). Then, control information used to control that the own device is brought into an open state is stored (step 703).

Figure 8:
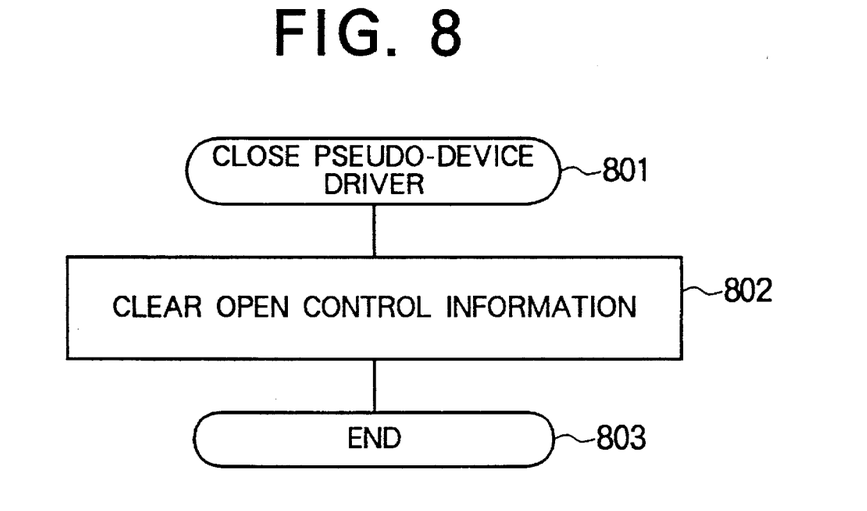
FIG. 8 is a flow chart for representing a close process operation of the test driver.

FIG. 8 is a flow chart for showing a close process operation of the device drivers 601 and 604. Upon receipt of a close process demand issued form the application program and the like to this device driver, the device driver clears the open control information which has been formed when this application program was previously open, and this close process operation is ended (step 802).

Figure 9:
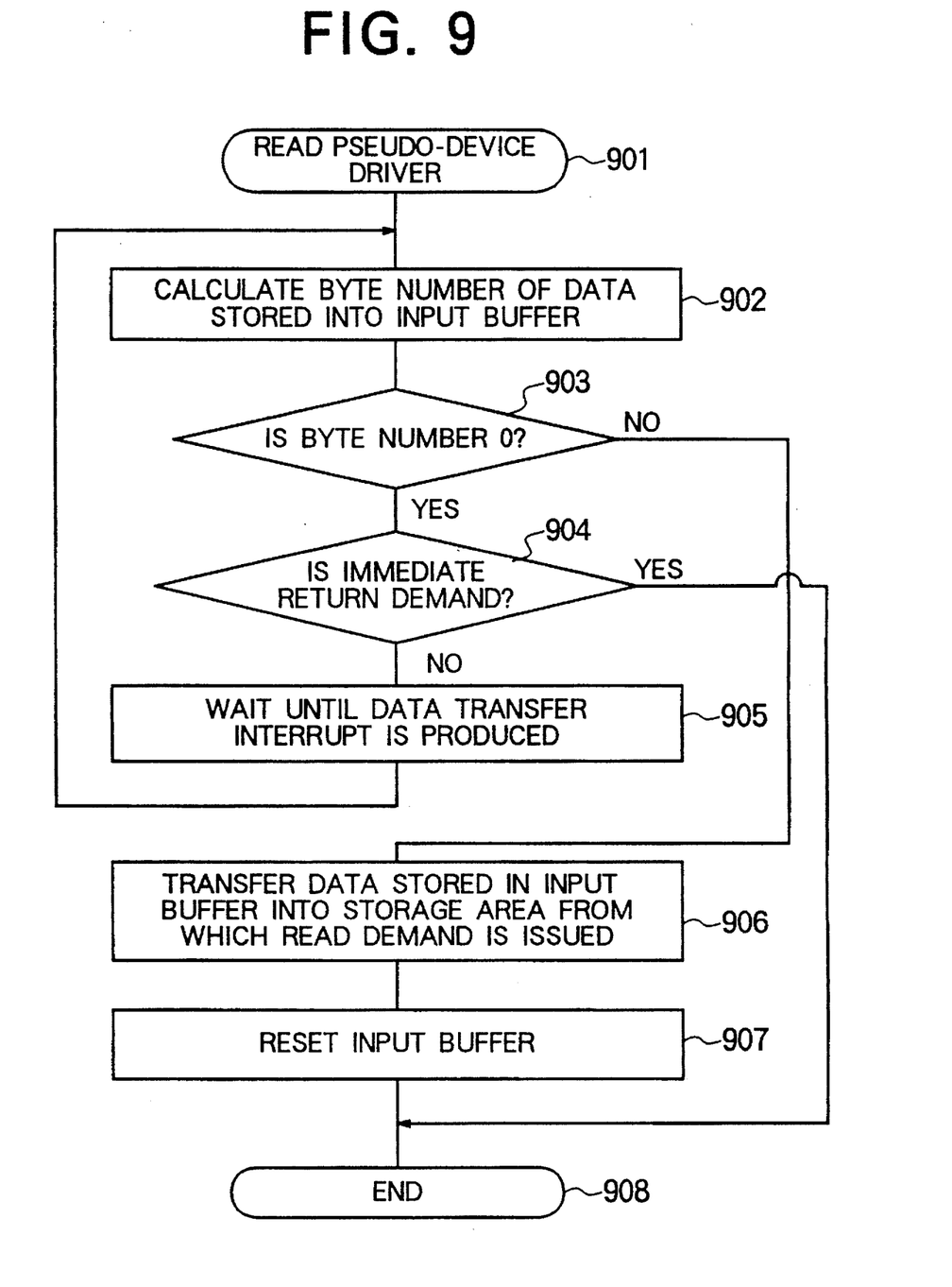
FIG. 9 is a flow chart for showing a read process operation of the test driver.

FIG. 9 is a flow chart for indicating a read process operation of the device drivers 601 and 604. Upon receipt of a read demand issued from the application program and the like to this device driver, the device driver first investigates the byte number of data located in the data buffer operated under data entry (step 902) thereby to judge whether or not this byte number corresponds to 0 (step 903). If the byte number is equal to 0, then another judgement is made as to whether or not this read demand corresponds to an immediately returning demand (step 904). The system waits for issuance of a data transfer interrupt so as to wait for an arrival of data, if this read demand is not the immediately returning demand (step 905). After the data is arrived, the process operation is again commenced from the process operation to check the byte number of the data stored into the buffer (step 902). When the byte number of the data stored in the input data buffer becomes 0, and further the read demand corresponds to the immediately returning demand, it is assumed that the byte number of the read data become 0, the process operation is accomplished without any execution (step 908). When it is judged at the step 903 that the byte number of the data is not equal to 0, the data stored in the input data buffer of the device driver is transferred to the memory region of the application program by which the read demand is issued, whose byte number is calculated at the step 902 (step 906). Then, a reset process operation to erase the transferred data from the data buffer is carried out (step 907).

Figure 10:
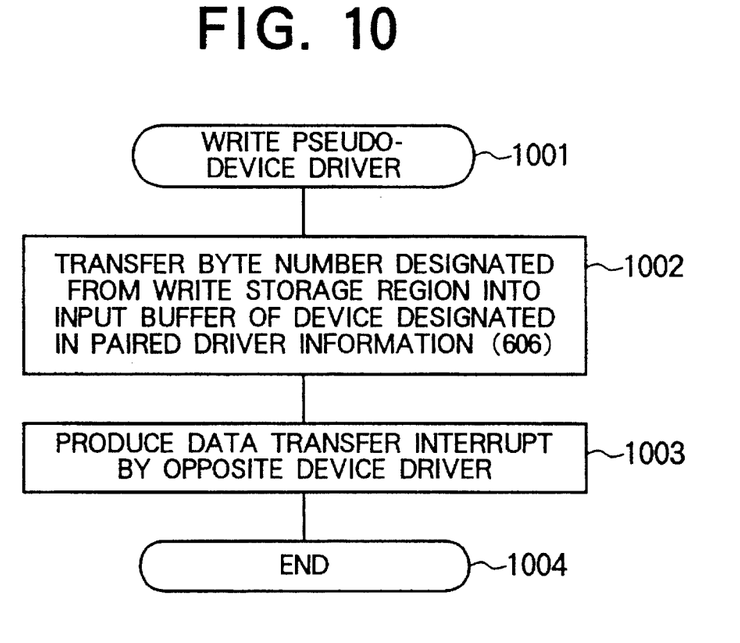
FIG. 10 is a flow chart for denoting a write process operation of the test driver.

FIG. 10 is a flow chart for explaining a write process operation of the device drivers 601 and 604. Upon issuance of a write demand from the application program or the like to this device driver, the device driver transfers the data with the designated byte number from the memory region of the application program issued the write demand into the input data buffer of the device designated in the paired device information 606 (step 1002), whereby a data transfer interrupt is issued from this designated device driver.

As previously explained with reference to FIG. 6 through FIG. 10, when alternations or modifications are made of the relevant device drivers, the application program configuration identical to that of the first embodiment, as described in FIG. 1 to FIG. 5, may be employed without requiring a physical connection cable.

Figure 11:
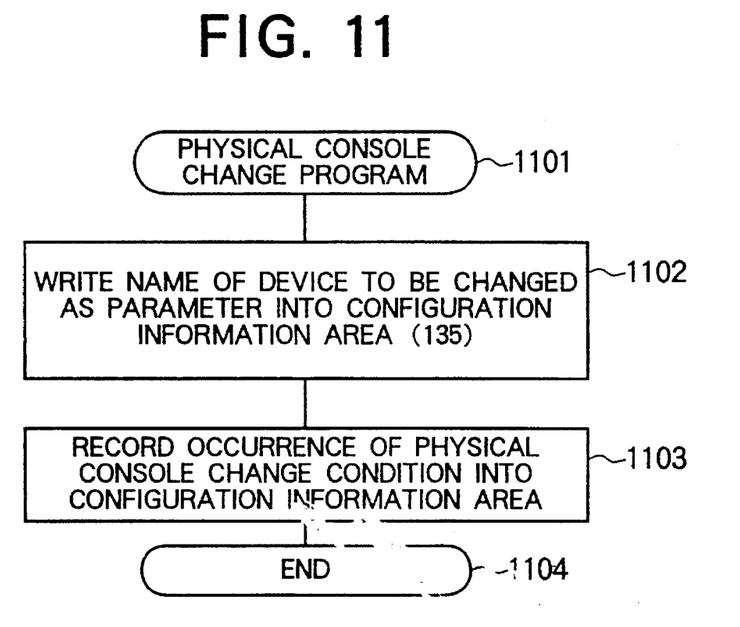
FIG. 11 is a flow chart for showing a changing process operation of a physical console program.

Next, a description will now be made of a method for executing a physical console change program capable of switching the operator console into an arbitrary console.

This physical console change program may be initiated as one application program at any arbitrary time instant. First, the name of the changed device of the physical console given as an initiation parameter is written into the configuration information region 135 (step 1102). Thereafter, issuance of a physical console change condition is recorded in the configuration information area 135 (step 1103).

Figure 12:
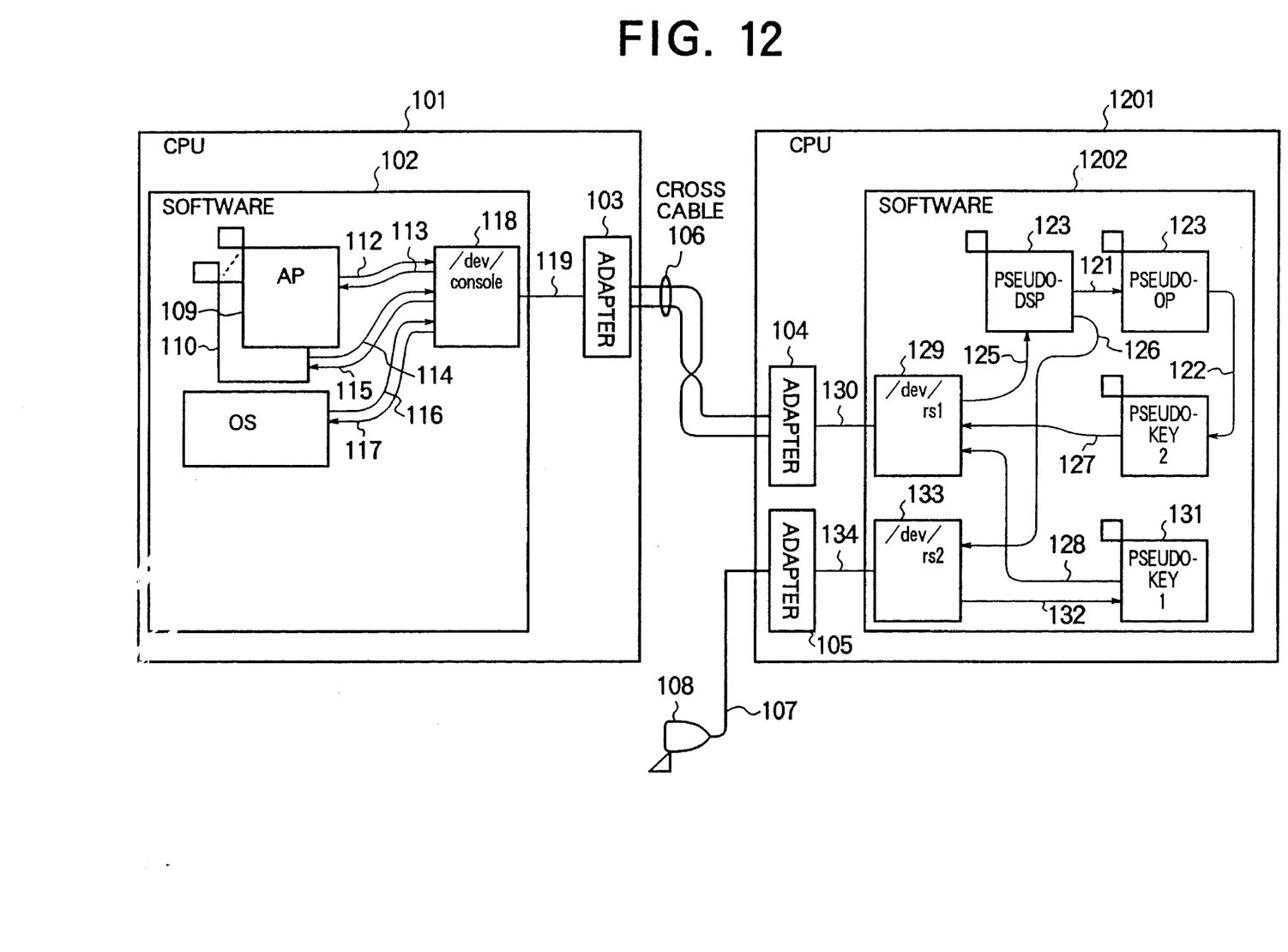
FIG. 12 is a schematic block diagram for representing automatic operation in case that a computer controlled to execute automatic operation is not identical to an automatic operation control computer.

Subsequently, a description will now be made of another embodiment in which both a message reception and a command supply are carried out by an automatic operation control computer connected to a computer controlled to execute automatic operation with reference to FIG. 12.

To an interface adaptor 103 used to connect the operator console of a computer 101 controlled to execute automatic operation, another computer 1201 controlled to execute automatic operation is connected via a cross cable 106. Both of a controlled software 102 employed within the computer 101 controlled to execute automatic operation, and a controlling software 1202 employed in the automatic operation control computer 1201 may be completely identical to those of the first embodiment shown in FIG. 1 to FIG. 5.

In accordance with this embodiment, even when such a failure happens to occur that the operating system of the computer 101 to be controlled is not operable, the controlling computer 1201 is supported by a large number of computers, and can receive the hardware console message sent from the operator console interface adaptor 103. As a result, even when a serious failure happens to occur in the computer 101 under control, the controlling computer 1201 can execute the relevant automatic command supply.

What is claimed is:

1. An automated operation machine that can be continued to run by sending back a response to a message given from a program, comprising:

an application program area having an application program;

a first device driver for transmitting via a first interface a console display message addressed from said application program area for automatic operation in a first preselected format for said first interface;

a first adaptor connected to the first device driver, for outputting via a console interface of said first adaptor said console display message in said first preselected format adapted for said console interface;

an operator program memory region having an operator program;

a second device driver for transmitting via a second interface a predetermined operator command from said operator program in correspondence to said console display message;

a second adaptor connected to said second device driver, for outputting via said console interface said operator command in said first preselected format;

a connection cable for mutually connecting said first adaptor with said second adaptor and for transmitting said console display message and said operator command between said first and second device drivers in order to continue said automatic operation in said application program by use of said console display message and said predetermined operator command; and, a configuration information area for storing addresses of said first and second device drivers, for indicating to which device driver said application program and said operator program should send said console display message and said predetermined operator command.

2. The automated operation machine as claimed in claim 1 wherein said first and second adaptors each have one pair of input and output terminals, and said connection cable is mutually cross-connected between said input and output terminals.

3. The automated operation machine as claimed in claim 1, further comprising:

at least one other device driver;

a memory for storing a program of automatic operation and said operator program;

wherein said configuration information area further stores addresses of said at least one other device driver; and, wherein said memory stores a console change program for changing the content of said configuration information area.

4. The automated operation machine as claimed in claim 1, further comprising:

an operating system for running a program of automatic operation and said operator program on said program of automatic operation;

wherein said first device driver, said first adaptor, said second device driver, said operator program memory region, and said second adaptor are contained in a single computer, and said console display message is outputted from said first device driver when an entry of an operator command is required so as to continue the operation of said operating system and said program of automatic operation.

5. The automated operation machine as claimed in claim 3 wherein said operator program memory region stores a display program used to output said console display message received from said first device driver in a predetermined display format; and, said automated operation machine further comprises:

a third device driver for transmitting said console display message upon designation of an address;

a third adaptor connected to said third device driver, for outputting said console display message in a predetermined format; and, a console connected to said third adaptor, for actually displaying said console display message.

6. The automated operation machine as claimed in claim 5, further comprising:

a fourth device driver connected to said operator program memory region, and addressed by said display program with reference to said configuration information area, thereby outputting said console display message;

a fourth adaptor connected to said fourth device driver, for outputting said console display message in a predetermined format; and, a second console connected to said fourth adaptor.

7. The automated operation machine as claimed in claim 6, further comprising a LAN (local area network) coupled between said fourth adaptor and said fourth device driver.

8. The automated operation machine as claimed in claim 1 wherein said first device driver and said first adaptor are contained in one computer, whereas said third device driver, said operator program memory region, and said third adaptor are contained in a second computer.

9. An automated operation machine that can be continued to run by sending back a response to a message given from a program within a computer, comprising:

an application program area having an application program of automatic operation;

a CPU (central processing unit);

a first device driver for transmitting via a first interface a console display message addressed from said application program area for automatic operation in a first format adapted for said first interface;

a first adaptor connected to the first device driver, for outputting via a console interface of said first adaptor said console display message in a preselected format adapted for said console interface;

an operator program memory region having an operator program;

a second device driver for transmitting via a second interface a predetermined operator command given from said operator program in correspondence to said console display message;

a storage for storing said program of automatic operation and said operator program;

a second adaptor connected to said second device driver, for outputting via said console interface said predetermined operator command in a preselected format; and, a connection cable for mutually connecting said first adaptor with said second adaptor and for transmitting said console display message and said operator command between said first and second device drivers to continue said automatic operation in said application program by use of said console display message and said operator command.

10. The automated operation machine as claimed in claim 9 wherein said first and second adaptors each have one pair of input and output terminals, and said connection cable is mutually cross-connected between said input and output terminals.

11. The automated operation machine as claimed in claim 10 further comprising:

a configuration information area for storing addresses of said first and second device drivers for indicating to which device driver said application program and said operator program should send said console display message and said operator command;

said storage storing a console change program used to change the content of said configuration information area.

12. The automated operation machine as claimed in claim 11, further comprising:

an operating system for realizing said program of automatic operation and running of said operator program on said automatic operation program;

wherein said first device driver, said first adaptor, said third device driver, said operator program memory region, and said third adaptor are contained in a single computer, and said console display message is outputted from said first device driver when an entry of an operator command is required so as to continue the operation of said operating system and said automatic operation program.

13. The automated operation machine as claimed in claim 9, further comprising:

a configuration information area for storing addresses of said first and second device drivers for indicating to which device driver said application program and said operator program should send said console display message and said operator command;

said storage storing a console change program used to change the content of said configuration information area.

14. The automated operation machine as claimed in claim 13, further comprising:

an operating system for realizing said program of automatic operation and running of said operator program on said automatic operation program;

wherein said first device driver, said first adaptor, said third device driver, said operator program memory region, and said third adaptor are contained in a single computer, and said console display message is outputted from said first device driver when an entry of an operator command is required so as to continue the operation of said operating system and said automatic operation program.

15. An automated operation machine that can be continued to run by sending back a response to a message given from a program within a computer, comprising:

an application program area having an application program;

a first device driver for transmitting via a first interface a console display message addressed from said application program area for automatic operation in a first format adapted for said first interface;

an operator program memory region having an operator program;

a second device driver for transmitting via a second interface a predetermined operator command given from said operator program in correspondence to said console display message;

means for mutually connecting said first adaptor with said second adaptor and for transmitting said console display message and said operator command between said first and second device drivers in order to continue said automatic operation in said application program by use of said console display message and said operator command;

a memory for storing said program of automatic operation and said operator program; and, a configuration information area for storing addresses of said first and second device drivers.

16. The automated operation machine as claimed in claim 15, wherein said operator program memory region stores a display program used to output said console display message received from said first device driver in a predetermined display format;

wherein said automated operation machine further comprises:

a third device driver for transmitting said console display message upon designation of an address;

a third adaptor connected to said third device driver, for outputting said console display message in a predetermined format; and, a console connected to said third adaptor, for actually displaying said console display message.

17. The automated operation machine as claimed in claim 16, further comprising:

a configuration information area for storing an address of said first device driver, said second device driver and said third device driver for indicating to which device driver said application program and said operator program should send said message and said operator command;

a fourth device driver connected to said operator program memory region, and addressed by said display program with reference to said configuration information area, thereby outputting said console display message;

a fourth adaptor connected to said third device driver, for outputting said console display message in a predetermined format; and, a second console connected to said fourth adaptor.

* * * * *